Jan. 26, 1954     G. W. HARDIGG     2,667,327
ROTOR CONSTRUCTION
Filed June 14, 1950

WITNESSES:
D. J. McCartey
E. H. Lutz

INVENTOR
GEORGE W. HARDIGG
BY
Ralph T. French
ATTORNEY

Patented Jan. 26, 1954

2,667,327

UNITED STATES PATENT OFFICE 2,667,327

ROTOR CONSTRUCTION

George W. Hardigg, Ridley Park, Pa., assignor to Westinghouse Electric Corporation, East Pittsburgh, Pa., a corporation of Pennsylvania Application June 14, 1950, Serial No. 168,019

2 Claims. (Cl. 253—77)

This invention relates to bladed rotors, more particularly to rotors having blades of the side-entry type, and has for an object to provide improved apparatus of this character.

Another object of the invention is to provide a novel member for retaining a side-entry type blade in its spindle or disc slot.

It has been known heretofore to reduce or eliminate fatigue failure in blades of axial-flow compressors through dissipation of the energy associated with blade excitation by mounting the blades loosely in their disc slots so that as they vibrate, their roots move in their disc slots as in a bearing, thereby dissipating the energy in friction.

While this was successful in eliminating blade failures, it created an equally serious problem of disc failure. The rubbing action of the blade root on the disc material produced fretting corrosion resulting in fatigue failure of the disc as evidenced by cracks starting at the points of rubbing contact between the blade root and disc, as indicated schematically in Fig. 1.

While not limited thereto, the problem is particularly severe where the spindle or disc is aluminum and the blades are steel, with consequent high coefficient of friction resulting in high localized heat at the areas of rubbing. Also, the poor strength characteristics of aluminum under conditions of elevated temperatures adds to the problem where this material is used for the disc or spindle.

In accordance with the present invention, the above-discussed disc failures are remedied by the insertion of a thin steel sleeve or liner between the blade root and the disc. This liner will allow the blade root to move in its lined slot, at the same time protecting the disc from rubbing and consequent failure. Since the friction of the steel root against the steel sleeve is only about one-third of that which occurs between a steel root or liner and an aluminum disc, all of the movement will take place between the root and liner. Only one-third as much heat will be generated through friction when the steel liner is used, and this limited heat will be spread over a greater area by the time it reaches the disc.

Accordingly, another object of the invention is to provide means for eliminating disc failures due to friction between such discs and the roots of blades carried thereby.

Yet another object of the invention is to provide means for reducing friction between the roots of steel blades and an aluminum disc in which the blades are mounted.

These and other objects are effected by the invention as will be apparent from the following description and claims taken in connection with the accompanying drawings, forming a part of this application, in which:

Figure 1:
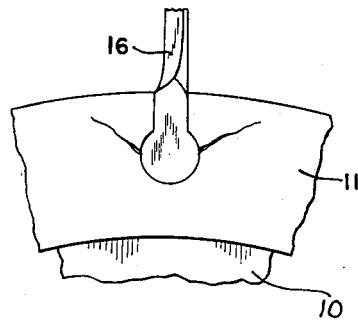
Fig. 1 is a fragmentary schematic view illustrating a problem solved by the present invention.
Figure 2:
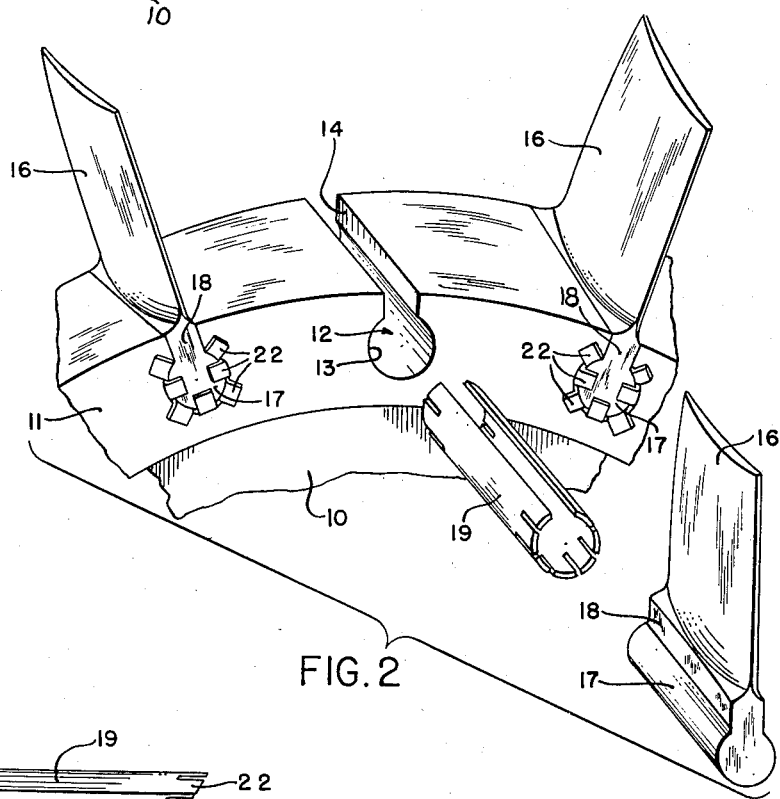
Fig. 2 is a fragmentary, partially exploded view of a bladed disc utilizing the present invention; and, Fig. 3 is a top elevational view of one of the liners utilized in the structure of Fig. 2.
Figure 3:
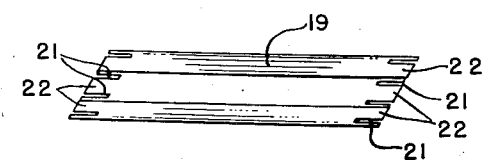

Referring now to the drawings in greater detail, the reference character 10 indicates a blade-carrying member in the form of a compressor disc which may be made of aluminum and has a rim 11 provided with a circumferential series of keyhole type slots 12 comprising bulbous portions 13 and neck portions 14 of reduced width opening through the periphery of the disc rim 11.

Blades or vanes 16, preferably of steel, are carried by the disc 10, and have bulbous root portions 17 disposed in the corresponding bulbous portions 13 of the disc slots 12, with neck portions 18 of reduced width fitting closely in the corresponding neck portions 14 of the slots 12.

The bulbous portions 17 of the roots are materially smaller than the corresponding bulbous portions 13 of the slots, the space between the two being occupied by a sleeve or liner 19, preferably also of steel. Inasmuch as the friction of steel against steel (the blade root against the liner) is only about one-third of the friction between steel and aluminum (the liner and the disc), all friction will be between the root and liner and of relatively small amount well within safe limits.

A further novel feature of the invention resides in the utilization of the liners 19 as means for preventing axial movement of the blade roots in their slots. To this end, the terminal portions of the liners 19 are slotted, as at 21, to provide a plurality of tabs 22, the liners being longer than their associated blade roots and disc slots so that the tabs of the liners extend beyond the sides of the disc. Alternate tabs are bent at right angles to abut the sides of the disc and the remaining tabs are bent in the opposite direction to abut the ends of the blade roots.

While the invention has been shown in but one form, it will be obvious to those skilled in the art that it is not so limited, but is susceptible of various changes and modifications without departing from the spirit thereof.

What is claimed is:

1. In a rotor, the combination of an aluminum blade-carrying member having a circumferential series of slots for reception of side-entry type blade roots, a circumferential series of blades, each including a side-entry type steel root of bulbous cross section disposed in one of said slots, and sleeve-like steel liners positioned in said slots between the walls of the latter and the blade roots.

2. The combination as specified in claim 1, including tabs integral with the liners at their terminal portions and projecting beyond the ends of the associated blade roots, some of said tabs abutting the ends of the blade roots and others abutting the sides of the blade carrying member.

GEORGE W. HARDIGG.

References Cited in the file of this patent

UNITED STATES PATENTS

| Number | Name | Date |
| --- | --- | --- |
| 1,149,658 | London | Aug. 10, 1915 |
| 1,606,029 | Herr | Nov. 9, 1926 |
| 2,434,935 | Kroon | Jan. 27, 1948 |
| 2,487,685 | Young | Nov. 8, 1949 |

FOREIGN PATENTS

| Number | Country | Date |
| --- | --- | --- |
| 375,059 | France | June 29, 1907 |